United States Patent
Touchberry et al.

(10) Patent No.: US 9,829,320 B2
(45) Date of Patent: Nov. 28, 2017

(54) SYSTEMS AND METHODS FOR DYNAMIC PATH LENGTH CONTROL MODULATION

(71) Applicant: Honeywell International Inc., Morris Plains, NJ (US)

(72) Inventors: Alan Bruce Touchberry, St. Louis Park, MN (US); Steven P. Ecklund, St. Anthony, MN (US)

(73) Assignee: Honeywell International Inc., Morris Plains, NJ (US)

( * ) Notice: Subject to any disclaimer, the term of this patent is extended or adjusted under 35 U.S.C. 154(b) by 117 days.

(21) Appl. No.: 14/920,681

(22) Filed: Oct. 22, 2015

(65) Prior Publication Data

US 2017/0115118 A1    Apr. 27, 2017

(51) Int. Cl.
*G01C 19/66*    (2006.01)

(52) U.S. Cl.
CPC ................. *G01C 19/665* (2013.01)

(58) Field of Classification Search
CPC ...... G01C 19/00; G01C 19/66; G01C 19/667; G01C 19/662
USPC .................................... 356/472, 473
See application file for complete search history.

(56) References Cited

U.S. PATENT DOCUMENTS

| | | |
|---|---|---|
| 5,357,338 A | 10/1994 | Hutchings |
| 5,363,194 A * | 11/1994 | Killpatrick ........... G01C 19/661 356/459 |
| 5,450,198 A * | 9/1995 | Killpatrick ........... G01C 19/665 356/473 |
| 8,259,302 B2 | 9/2012 | Ecklund et al. |
| 2006/0164650 A1 | 7/2006 | Zurn et al. |
| 2006/0290940 A1 | 12/2006 | Beaudet et al. |
| 2012/0026502 A1 | 2/2012 | Ecklund et al. |

FOREIGN PATENT DOCUMENTS

WO    9837382    8/1998

OTHER PUBLICATIONS

European Patent Office, "Replacement European Search Report from EP Application No. 16194255.2 dated May 9, 2017", "from Foreign Counterpart of U.S. Appl. No. 14/920,681", May 9, 2017, pp. 1-4.
European Patent Office, "Extended European Search Report from EP Application No. 16194255.2 dated Mar. 31, 2017", "from Foreign Counterpart of U.S. Appl. No. 14/920,681", Mar. 31, 2017, pp. 1-7, Published in: EP.

\* cited by examiner

*Primary Examiner* — Jonathan Hansen
(74) *Attorney, Agent, or Firm* — Fogg & Powers LLC

(57) ABSTRACT

Systems and methods for dynamic PLC modulation are provided. In certain embodiments, a gyroscope system includes a block having cavities and passages that define a path; mirrors, each located in one of the cavities, direct light along the path defined by the cavities and the passages; a mirror drive coupled to one of the mirrors to change a position of the mirror, wherein the path's length is changed as the mirror's position changes; a photodetector that measures power of light along the path; and a controller that provides a control signal indicative of an amplitude of PLC modulation and a PLC frequency to the mirror drive; wherein the mirror drive, in response to the control signal, changes the position of the mirror at the frequency, wherein the mirror drive moves based on the amplitude; and wherein the controller changes the amplitude in relation to the measured power of the light.

18 Claims, 3 Drawing Sheets ns and METHODS FOR DYNAMIC
PATH LENGTH CONTROL MODULATION

BACKGROUND

In many implementations of a ring laser gyroscope (RLG), controlling electronics for the RLG modulate the path length of the lasers while observing the laser power. The controlling electronics adjust the path length to maintain peak power. In operation of the RLG, the controlled magnitude of the modulation affects the performance of the RLG. For example, a larger modulation may negatively impact the performance of the RLG. Also, RLGs, as they near the end of their life cycle, may experience a decrease in laser power. In this situation, to detect a laser power peak, the modulation may be set to a fixed amplitude having sufficient magnitude for the lower laser power, however, the larger amplitude used for the end of the life cycle may be too large for the RLG at the beginning of the life cycle.

SUMMARY

Systems and methods for dynamic path length control modulation are provided. In certain embodiments a gyroscope system includes a gyroscope block having a plurality of cavities and a plurality of passages that define a path; a plurality of mirrors each located in one of the plurality of cavities, each of the plurality of mirrors configured to direct light along the path defined by the plurality of cavities and the plurality of passages; at least one mirror drive coupled to one of the plurality of mirrors and configured to change a position of the respective mirror, wherein the path length is changed by the change in the position of the respective mirror; a photodetector configured to measure power of the light directed along the path; and a controller configured to provide a control signal indicative of an amplitude of path length control modulation and indicative of a path length control frequency to the at least one mirror drive; wherein the at least one mirror drive is responsive to the control signal to change the position of the respective mirror at the path length control frequency, wherein the at least one mirror drive moves based on the amplitude of path length control modulation; and wherein the controller is configured to change the amplitude of path length control modulation in relation to the measured power of the light directed along the path.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
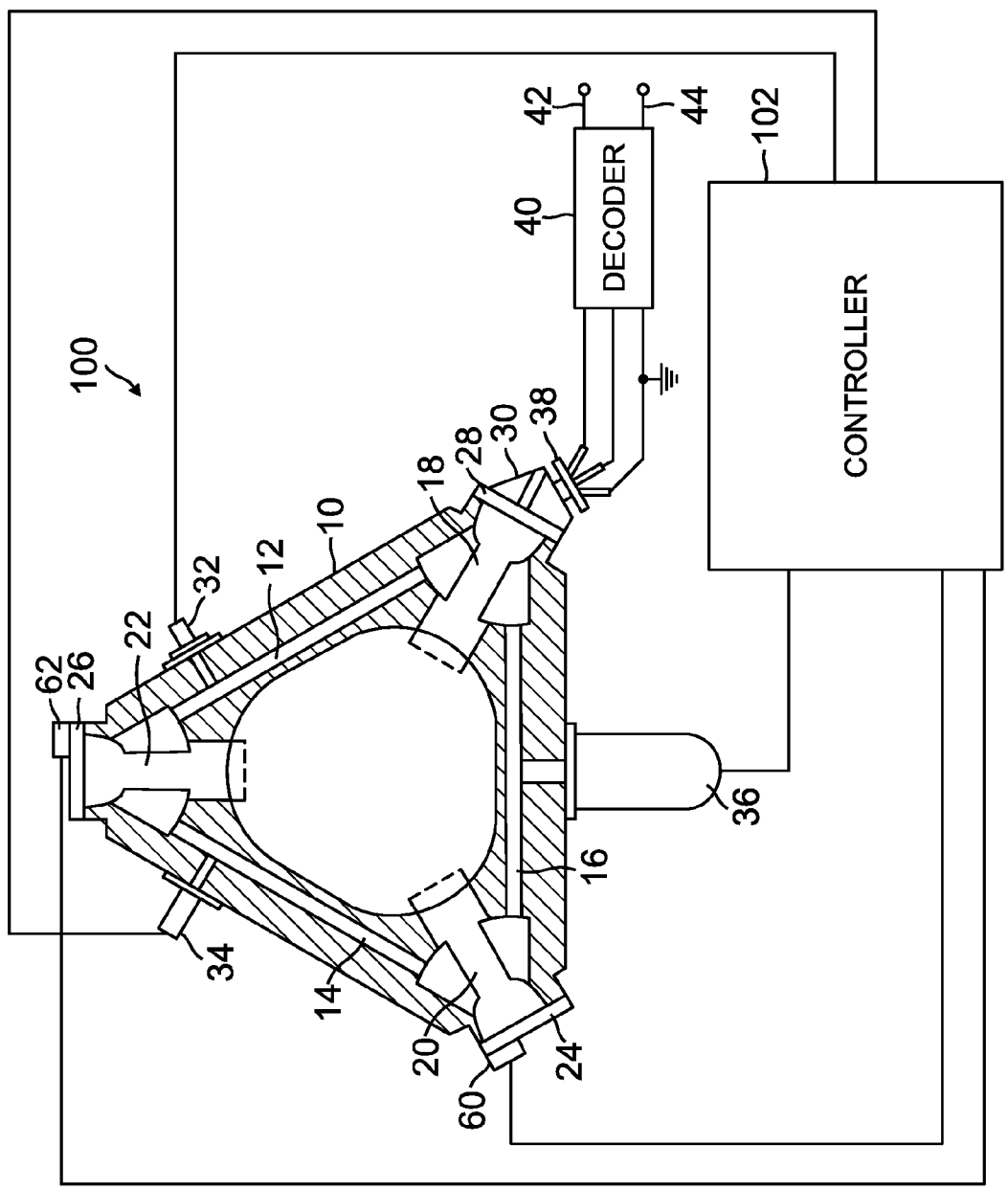
FIG. 1 is a diagram illustrating an gyroscope in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments for a dynamic path length control modulation are described herein. For example, a path length control (PLC) for an RLG may change the PLC modulation amplitude based on the stage in the life cycle and the operational phase of the RLG. For example, the PLC may use different PLC modulation amplitudes during the start-up of the RLG. Also, the PLC may configure different PLC modulation amplitudes during the beginning of the life cycle of the RLG as compared to the end of the life cycle of the RLG. In certain implementations, the PLC alternating current modulation (referred to hereinafter as PLC modulation) may be increased at start-up to allow the quick acquisition of a mode without increasing the discharge current, which increase in discharge current may result in multiple modes propagating within the ring laser cavity. Once the mode is acquired, the laser power can be used to adjust the modulation to set the most appropriate PLC modulation that allows the tracking of the PLC mode peak. Further, as the RLG ages and the laser power declines, the PLC modulation can be increased based on the peak laser power to maintain the ability to keep the DC position at the peak of the mode. The larger PLC modulation may improve the ability to find the mode peak at start up. Then the PLC modulation may be reduced during operation to reduce error effects while accounting for life changes.

FIG. 1 is a block diagram of one embodiment of a gyroscope system 100 that may be used in a ring laser gyroscope that implements dynamic PLC modulation. In certain implementations, gyroscope system 100 includes a gyroscope block 10. In this and other embodiments, the gyroscope block 10 may be a thermally and mechanically stable triangularly-shaped glass-ceramic block. However, in other embodiments, other shapes and materials may be used. The gyroscope block 10 contains a plurality of passages 12, 14, and 16 which in turn contain a gas mixture, such as helium-neon. A cavity 18 interconnects the passages 12 and 16, a cavity 20 interconnects the passages 14 and 16, and a cavity 22 interconnects the passages 12 and 14 to form a continuous cavity. The gyroscope block 10 may also include mirrors 24 and 26 positioned adjacent to and in communication with the cavities 20 and 22, respectively. A partially transmissive output mirror 28 may be positioned adjacent to and in communication with the cavity 18. The mirrors 24, 26, and 28 direct clockwise and counterclockwise traveling laser beams within the glass ceramic block 10 as described in further detail below. In certain implementations, a beam combiner 30 may be coupled to the partially transmissive output mirror 28.

In certain implementations, a first anode 32 may be mounted on the glass ceramic block 10 between the cavities 18 and 22 and is in communication with the passage 12. A second anode 34 may be similarly mounted on the glass ceramic block 10 between the cavities 20 and 22 and is in communication with the passage 14. A cathode 36 is mounted on the glass ceramic block 10 between the cavities 18 and 20 and is in communication with the passage 16. A controller 102 electrically energizes the first and second anodes 32 and 34 and the cathode 36 which results in lasing of the gas mixture to establish clockwise and counterclockwise laser beams within the passages 12, 14, and 16 and the cavities 18, 20, and 22. In an alternative implementation, one or more lasers mounted to the glass ceramic block 10 may introduce counter-propagating laser beams into the passages 12, 14, and 16 and the cavities 18, 20, and 22.

The clockwise and counterclockwise laser beams are reflected by the mirrors 24, 26, and 28, and are partially transmitted through the partially transmissive output mirror 28. The portions of the clockwise and counterclockwise laser beams which are transmitted through the partially transmissive output mirror 28 are combined by the beam combiner 30 and are then directed onto a photodetector 38. The photodetector 38 detects the laser power of either a single laser beam or the combined clockwise and counterclockwise laser beams.

The gyroscope system 100 also includes a path length control (PLC) system. In the example shown in FIG. 1, the PLC system includes two mirror drives 60 and 62, each drive coupled to the back of one of the mirrors 24, and 26, respectively. In this exemplary embodiment, the mirror drives 60 and 62 are implemented as piezoelectric transducers (PZT). The thickness of the PZT 60, and 62 is controlled by a modulation voltage signal which is provided to each PZT by the controller 102. In some embodiments, as the voltage is increased, the thickness of the corresponding PZT is decreased. Decreasing the thickness of the PZT in turn increases the path length since each PZT is on the back of a respective mirror. In such embodiments, decreasing the voltage increases the thickness which in turn decreases the path length. However, it is to be understood that the voltage polarity, PZT position, and PZT operation may be reversed in other embodiments. For example, each PZT can be configured to increase in thickness with increasing voltage and vice versa. The frequency of the modulation voltage signal provided by the controller 102 to PZT 60 and 62 is also referred to herein as the PLC modulation frequency. The modulation voltage signal can be implemented as a sinusoidal, square wave, triangle wave, sawtooth signal, etc. Further, by increasing the amplitude of the voltage, the amplitude of the PLC modulation may also be increased.

In certain embodiments, the controller 102 controls the path length control modulation amplitude and a direct current position for the gyroscope. In one implementation, the controller 102 changes the path length control modulation such that during the startup of the gyroscope system 100, the controller 102 increases the amplitude of PLC modulation. After start up, the controller 102 monitors the gyroscope system 100 to determine whether or not the gyroscope system 100 has acquired a mode. For example, the controller 102 measures the laser power when the PLC modulation is approximately near a maximum and when it is near a minimum. The controller 102 then determines which of the maximum and minimum is associated with the larger laser power. The controller 102 then shifts the DC center position towards the higher laser power until the laser power associated with both the approximately maximum and approximately minimum PLC modulation is approximately equal. When the laser power associated with the extremes of PLC modulation is approximately equal the controller 102 may determine that the DC center position is located at a peak laser power and that a laser mode has been acquired by the gyroscope. When the controller 102 determines that a mode has been acquired, the controller 102 decreases the amplitude of the PLC modulation to a steady state. As explained above, the controller 102 monitors the laser power at start up and determines that a mode has been reached when the DC center position is located at a peak laser power. When the laser power reaches a peak, the controller 102 may decrease the amplitude of the PLC modulation. In some implementations, the amplitude of the PLC modulation is reduced while still maintaining the peak laser power.

In at least one example, the amplitude of the PLC modulation may be increased at start up, such that the amplitude is substantially about 50% of a mode. By increasing the amplitude of the PLC modulation to about 50%, the controller 102 significantly increases the probability that the gyroscope system 100 will be able to acquire a mode. When the mode is acquired by the gyroscope system 100, the controller 102 may decrease the amplitude of the PLC modulation towards a steady state operating point. In certain implementations the steady state operating point may be a few hundredths of a mode. The amplitudes described above are only intended to be examples of different ranges for the amplitudes of the PLC modulation.

Further, in some implementations, the amount that the controller 102 changes the amplitude of the PLC modulation may change with the age of the gyroscope system 100. As a gyroscope system 100 ages, the laser power decreases. As the laser power decreases, it becomes increasingly difficult to position the DC position with the peaks of the laser power, such that the DC center position is at the peak of the laser power mode. In particular, as the laser power decreases, the laser power peaks become increasingly less defined. Accordingly, to increase the accuracy of determining whether the DC center position is centered on a peak of the laser power, the PLC amplitude may be increased such that the center position is within the amplitude of the PLC modulation. The increase of the amplitude of the PLC modulation causes the measurements associated with the end points of the PLC modulation to be farther apart, which allows for a better definition and sharper peak laser power when determining whether the DC center point is centered on the peak laser power. Accordingly, as the controller 102 monitors the peak laser power, the peak laser power decreases over the life span of the gyroscope system 100 and it becomes increasingly difficult to determine whether the DC point is centered on the laser power peak. As such, the controller 102 increases the amplitude of the PLC modulation inversely proportional to decreases in the peak laser power. Alternatively, the amplitude of the PLC modulation may be increased until the controller 102 can align the DC position on the peak laser power. In one implementation, the controller 102 may compare the laser power against a power threshold and set the PLC amplitude to one value when the laser power is greater than the power threshold and to a second value when the laser power is less than the threshold.

Figure 2:
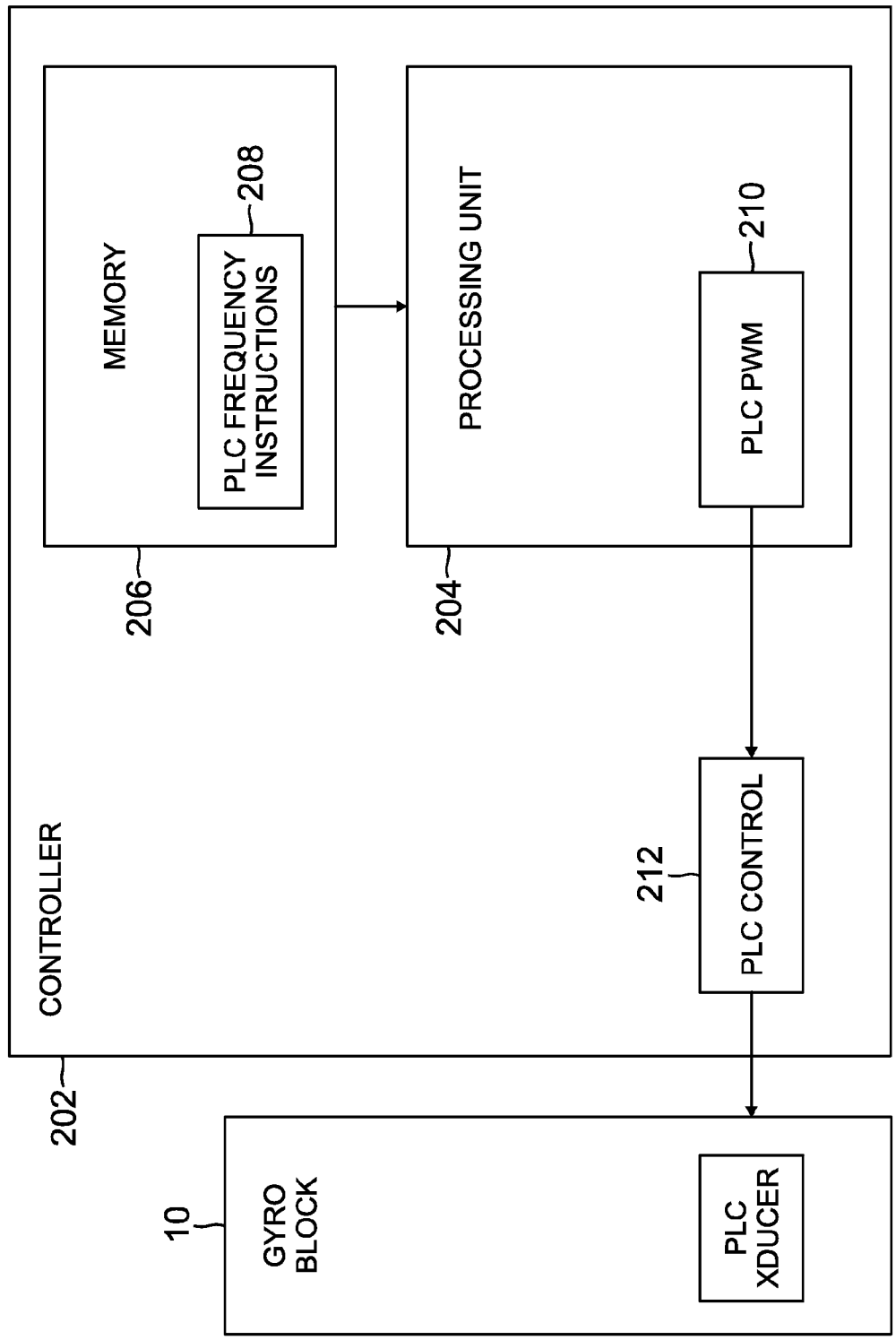
FIG. 2 is a block diagram of a controller for a gyroscope in one embodiment described in the present disclosure.

The controller 102 can be implemented using hardware, software, firmware, or any combination thereof. For example, in some embodiments, the controller 102 is implemented using analog circuits known to one of skill in the art to adjust the PLC modulation amplitude based on the laser power detected by the decoder 40. In other embodiments, digital circuits involving a processing unit executing an algorithm are used. For example, FIG. 2 is a simplified block diagram depicting an exemplary embodiment of a controller 202 implemented using digital logic. The controller 202 includes a processing unit 204 and a memory 206.

The processing unit 204 includes or functions with software programs, firmware or other computer readable instructions for carrying out various methods, process tasks, calculations, and control functions, used in controlling the amplitude of the PLC modulation. For example, processing unit 204 can include or interface with hardware components and circuitry such as, but not limited to, one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA).

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to Synchronous Dynamic Random Access Memory (SDRAM), Double Data Rate (DDR) RAM, RAMBUS Dynamic RAM (RDRAM), static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. In the embodiment shown in FIG. 2, a PLC instructions 208 is stored on the memory 206 and executed by the processing unit 204.

When executed, the PLC instructions 208 cause the processing unit 204 to control the amplitude and frequency of the PLC modulation as controlled by the PLC control 212 based on either the operational state of the gyroscope system 100 or the peak laser power. For example, the PLC instructions 208 direct the processing unit 204 to send signals to the PLC control through a pulse-width modulator (PWM) 210 that change the amplitude of the PLC modulation during the startup phase and also inversely proportional with changes in the peak laser power as described above.

Figure 3:
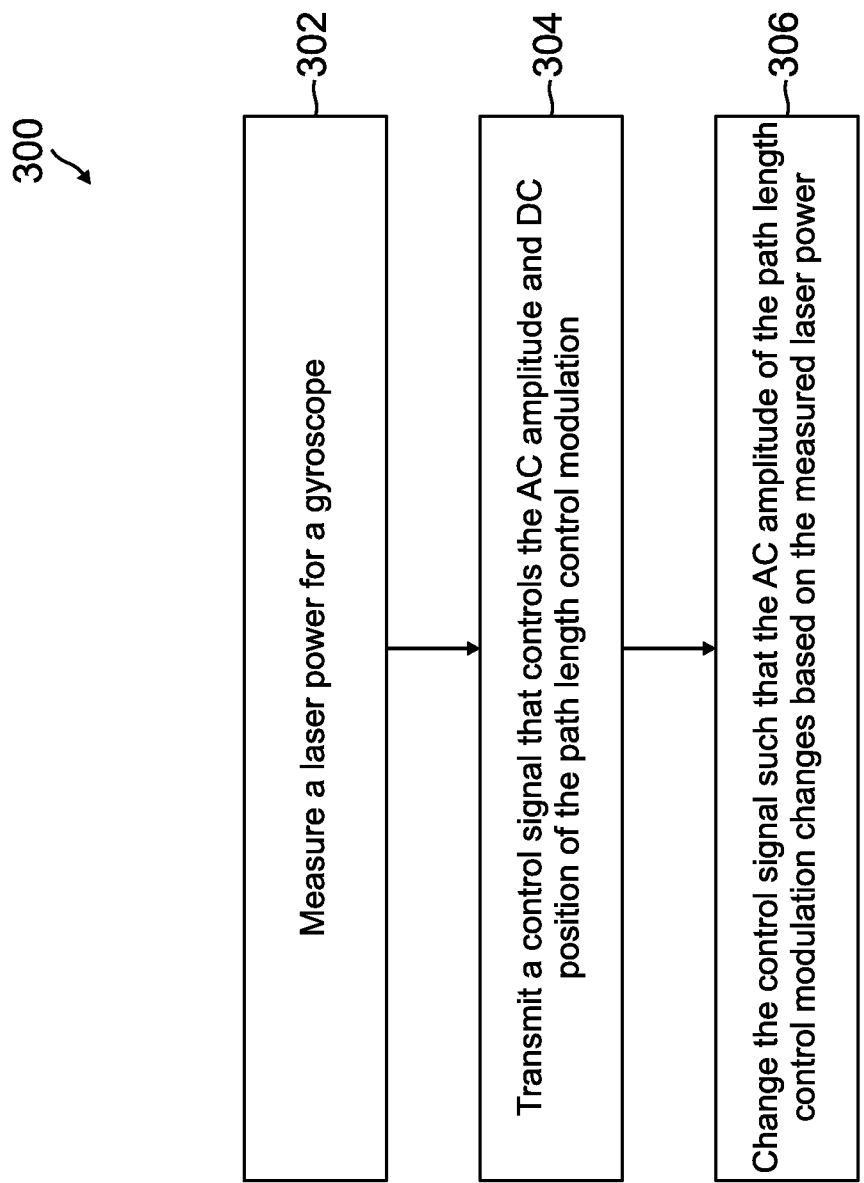
FIG. 3 is a flow diagram of a method for controlling amplitude of path length control modulation in one embodiment described in the present disclosure.

FIG. 3 is a flow diagram for a method 300 for controlling the amplitude of the path length control. Method 300 proceeds at 302 where a laser power for a gyroscope is measured. The laser propagating within a cavity in the gyroscope. Method 300 proceeds at 304 where a control signal is transmitted that controls the AC amplitude and the DC position of the path length control modulation. The control signal controls actuators that change the distance that the laser propagates within the cavity according to a modulation frequency.

In certain embodiments, method 300 proceeds at 306 where the control signal is changed such that the AC amplitude of the path length control modulation changes based on the measured laser power. For example, the controller may increase the amplitude of path length control modulation during a startup phase of the gyroscope system until the gyroscope acquires a mode. When the gyroscope acquires a mode, the controller decreases the amplitude of path length control modulation. Further, in certain implementations, the controller may increase the amplitude of path length control modulation as the gyroscope ages and the laser power decreases due to the age of the gyroscope. As such, a gyroscope implementing the above systems and methods may be able to more quickly acquire modes at start up and have improved performance over the life of the gyroscope.

EXAMPLE EMBODIMENTS

Example 1 includes a gyroscope system comprising: a gyroscope block having a plurality of cavities and a plurality of passages that define a path; a plurality of mirrors each located in one of the plurality of cavities, each of the plurality of mirrors configured to direct light along the path defined by the plurality of cavities and the plurality of passages; at least one mirror drive coupled to one of the plurality of mirrors and configured to change a position of the respective mirror, wherein the path's length is changed by the change in the position of the respective mirror; a photodetector configured to measure power of the light directed along the path; and a controller configured to provide a control signal indicative of an amplitude of path length control modulation and indicative of a path length control frequency to the at least one mirror drive; wherein the at least one mirror drive is responsive to the control signal to change the position of the respective mirror at the path length control frequency, wherein the at least one mirror drive moves based on the amplitude of path length control modulation; and wherein the controller is configured to change the amplitude of path length control modulation in relation to the measured power of the light directed along the path.

Example 2 includes the gyroscope system of Example 1, wherein the controller increases the amplitude of path length control modulation during a startup phase of the gyroscope system; and decreases the amplitude of path length control modulation when the gyroscope system acquires a mode.

Example 3 includes the gyroscope system of Example 2, wherein the controller increases the amplitude of the path length control modulation to approximately fifty percent of a mode during the startup phase.

Example 4 includes the gyroscope system of any of Examples 2-3, wherein the controller determines that the gyroscope system has acquired a mode when the measured power of the light directed along the path reaches a peak value.

Example 5 includes the gyroscope system of any of Examples 2-4, wherein the controller decreases the amplitude of path length control modulation to such that path length control modulation is reduced while maintaining the acquired mode.

Example 6 includes the gyroscope system of any of Examples 1-5, wherein the controller changes the amplitude of path length control modulation based on a measured decrease in the power of the light directed along the path.

Example 7 includes the gyroscope system of Example 6, wherein the controller increases the amplitude of path length control modulation in inverse proportion to a decrease in a peak for the measured power of the light directed along the path from an initial peak power, wherein the initial peak power is determined when the gyroscope system is fabricated.

Example 8 includes the gyroscope system of any of Examples 6-7, wherein the controller increases the amplitude of path length control modulation such that a peak of the measured power of the light is within the path length control modulation.

Example 9 includes a method for controlling an alternating current (AC) amplitude of path length control modulation and direct current (DC) position for a gyroscope, the method comprising: measuring a laser power for the gyroscope; transmitting a control signal that controls the AC amplitude and DC position of the path length control modulation; changing the control signal such that the AC amplitude of the path length control modulation changes based on the measured laser power.

Example 10 includes the method of Example 9, wherein changing the control signal comprises: increasing the AC amplitude of path length control modulation during a startup phase of the gyroscope; and decreasing the AC amplitude of path length control modulation when the gyroscope acquires a mode for light traveling in a cavity, wherein the cavity is within the gyroscope.

Example 11 includes the method of Example 10, wherein increasing the AC amplitude further comprises increasing the AC amplitude of the path length control modulation to approximately fifty percent of a mode during the startup phase.

Example 12 includes the method of any of Examples 10-11, wherein the gyroscope has acquired the mode when the measured laser power reaches a peak value.

Example 13 includes the method of any of Examples 10-12, wherein the controller decreases the AC amplitude of path length control modulation to such that path length control modulation is reduced while maintaining the acquired mode.

Example 14 includes the method of any of Examples 9-13, wherein changing the control signal comprises changing the AC amplitude of path length control modulation based on a measured decrease in a peak measurement of the laser power.

Example 15 includes the method of Example 14, wherein changing the AC amplitude of path length control modulation comprises changing the amplitude of path length control modulation in inverse proportion to a decrease in the peak measurement of the laser power from an initial peak measurement of the laser power, wherein the initial peak measurement of the laser power is determined when the gyroscope is fabricated.

Example 16 includes the method of any of Examples 14-15, wherein changing the amplitude of path length control modulation comprises increasing the amplitude of path length control modulation such that a DC center point may be shifted to be at a peak of the measured power of the light.

Example 17 includes a gyroscope system comprising: a gyroscope block having a plurality of cavities and a plurality of passages that define a path; a plurality of mirrors each located in one of the plurality of cavities, each of the plurality of mirrors configured to direct light along the path defined by the plurality of cavities and the plurality of passages; at least one mirror drive coupled to one of the plurality of mirrors and configured to change a position of the respective mirror, wherein the path's length is changed by the change in the position of the respective mirror; a photodetector configured to measure power of the light directed along the path; and a controller configured to provide a control signal indicative of an amplitude of path length control modulation and indicative of a path length control frequency to the at least one mirror drive; wherein the at least one mirror drive is responsive to the control signal to change the position of the respective mirror at the path length control frequency, wherein the at least one mirror drive moves based on the amplitude of path length control modulation; wherein the controller increases the amplitude of path length control modulation during a startup phase of the gyroscope system; and decreases the amplitude of path length control modulation when the gyroscope system acquires a mode; and wherein the controller changes the amplitude of path length control modulation based on a measured decrease in the power of the light directed along the path.

Example 18 includes the gyroscope system of Example 17, wherein the controller determines that the gyroscope system has acquired a mode when the measured power of the light directed along the path reaches a peak value.

Example 19 includes the gyroscope system of any of Examples 17-18, wherein the controller increases the amplitude of path length control modulation in inverse proportion to a decrease in a peak for the measured power of the light directed along the path from an initial peak power, wherein the initial peak power is determined when the gyroscope system is fabricated.

Example 20 includes the gyroscope system of any of Examples 17-19, wherein the controller compares the measured power of the light directed along the path against a power threshold, wherein the controller sets the amplitude of path length control modulation to a first amplitude when the measured power of the light directed along the path is greater than the power threshold and the controller sets the amplitude of path length control modulation to a second amplitude when the measured power of the light directed along the path is less than the power threshold.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A gyroscope system comprising:
    a gyroscope block having a plurality of cavities and a plurality of passages that define a path;
    a plurality of mirrors each located in one of the plurality of cavities, each of the plurality of mirrors configured to direct light along the path defined by the plurality of cavities and the plurality of passages;
    at least one mirror drive coupled to one of the plurality of mirrors and configured to change a position of the respective mirror, wherein the path's length is changed by the change in the position of the respective mirror;
    a photodetector configured to measure power of the light directed along the path; and
    a controller configured to provide a control signal indicative of an amplitude of path length control modulation and indicative of a path length control frequency to the at least one mirror drive;
    wherein the at least one mirror drive is responsive to the control signal to change the position of the respective mirror at the path length control frequency, wherein the at least one mirror drive moves based on the amplitude of path length control modulation;
    wherein the controller increases the amplitude of path length control modulation during a startup phase of the gyroscope system; and decreases the amplitude of path length control modulation when the gyroscope system acquires a mode; and
    wherein the controller is configured to change the amplitude of path length control modulation in relation to the measured power of the light directed along the path.

2. The gyroscope system of claim 1, wherein the controller increases the amplitude of the path length control modulation to approximately fifty percent of a mode during the startup phase.

3. The gyroscope system of claim 1, wherein the controller determines that the gyroscope system has acquired a mode when the measured power of the light directed along the path reaches a peak value.

4. The gyroscope system of claim 1, wherein the controller decreases the amplitude of path length control modulation to such that path length control modulation is reduced while maintaining the acquired mode.

5. The gyroscope system of claim 1, wherein the controller changes the amplitude of path length control modulation based on a measured decrease in the power of the light directed along the path.

6. The gyroscope system of claim 5, wherein the controller increases the amplitude of path length control modulation in inverse proportion to a decrease in a peak for the measured power of the light directed along the path from an initial peak power, wherein the initial peak power is determined when the gyroscope system is fabricated.

7. The gyroscope system of claim 5, wherein the controller increases the amplitude of path length control modulation such that a peak of the measured power of the light is within the path length control modulation.

8. A method for controlling an alternating current (AC) amplitude of path length control modulation and direct current (DC) position for a gyroscope, the method comprising:
measuring a laser power for the gyroscope;
transmitting a control signal that controls the AC amplitude and DC position of the path length control modulation;
changing the control signal such that the AC amplitude of the path length control modulation changes based on the measured laser power;
increasing the AC amplitude of path length control modulation during a startup phase of the gyroscope; and
decreasing the AC amplitude of path length control modulation when the gyroscope acquires a mode for light traveling in a cavity, wherein the cavity is within the gyroscope.

9. The method of claim 8, wherein increasing the AC amplitude further comprises increasing the AC amplitude of the path length control modulation to approximately fifty percent of a mode during the startup phase.

10. The method of claim 8, wherein the gyroscope has acquired the mode when the measured laser power reaches a peak value.

11. The method of claim 8, wherein the controller decreases the AC amplitude of path length control modulation to such that path length control modulation is reduced while maintaining the acquired mode.

12. The method of claim 8, wherein changing the control signal comprises changing the AC amplitude of path length control modulation based on a measured decrease in a peak measurement of the laser power.

13. The method of claim 12, wherein changing the AC amplitude of path length control modulation comprises changing the amplitude of path length control modulation in inverse proportion to a decrease in the peak measurement of the laser power from an initial peak measurement of the laser power, wherein the initial peak measurement of the laser power is determined when the gyroscope is fabricated.

14. The method of claim 12, wherein changing the amplitude of path length control modulation comprises increasing the amplitude of path length control modulation such that a DC center point may be shifted to be at a peak of the measured power of the light.

15. A gyroscope system comprising:
a gyroscope block having a plurality of cavities and a plurality of passages that define a path;
a plurality of mirrors each located in one of the plurality of cavities, each of the plurality of mirrors configured to direct light along the path defined by the plurality of cavities and the plurality of passages;
at least one mirror drive coupled to one of the plurality of mirrors and configured to change a position of the respective mirror, wherein the path's length is changed by the change in the position of the respective mirror;
a photodetector configured to measure power of the light directed along the path; and
a controller configured to provide a control signal indicative of an amplitude of path length control modulation and indicative of a path length control frequency to the at least one mirror drive;
wherein the at least one mirror drive is responsive to the control signal to change the position of the respective mirror at the path length control frequency, wherein the at least one mirror drive moves based on the amplitude of path length control modulation;
wherein the controller increases the amplitude of path length control modulation during a startup phase of the gyroscope system; and decreases the amplitude of path length control modulation when the gyroscope system acquires a mode; and
wherein the controller changes the amplitude of path length control modulation based on a measured decrease in the power of the light directed along the path.

16. The gyroscope system of claim 15, wherein the controller determines that the gyroscope system has acquired a mode when the measured power of the light directed along the path reaches a peak value.

17. The gyroscope system of claim 15, wherein the controller increases the amplitude of path length control modulation in inverse proportion to a decrease in a peak for the measured power of the light directed along the path from an initial peak power, wherein the initial peak power is determined when the gyroscope system is fabricated.

18. The gyroscope system of claim 15, wherein the controller compares the measured power of the light directed along the path against a power threshold, wherein the controller sets the amplitude of path length control modulation to a first amplitude when the measured power of the light directed along the path is greater than the power threshold and the controller sets the amplitude of path length control modulation to a second amplitude when the measured power of the light directed along the path is less than the power threshold.

* * * * *